(12) United States Patent
Morisaki

(10) Patent No.: US 9,061,682 B2
(45) Date of Patent: Jun. 23, 2015

(54) HYBRID VEHICLE AND CONTROL METHOD THEREOF

(75) Inventor: Keisuke Morisaki, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 54 days.

(21) Appl. No.: 13/983,355

(22) PCT Filed: Feb. 3, 2011

(86) PCT No.: PCT/JP2011/052244
§ 371 (c)(1),
(2), (4) Date: Aug. 2, 2013

(87) PCT Pub. No.: WO2012/105021
PCT Pub. Date: Aug. 9, 2012

(65) Prior Publication Data
US 2013/0317682 A1 Nov. 28, 2013

(51) Int. Cl.
| | |
|---|---|
| *B60L 9/00* | (2006.01) |
| *B60W 20/00* | (2006.01) |
| *B60W 10/06* | (2006.01) |
| *B60W 10/08* | (2006.01) |
| *B60L 11/08* | (2006.01) |
| *B60L 11/18* | (2006.01) |
| *B60L 15/20* | (2006.01) |
| *B60K 6/445* | (2007.10) |
| *B60K 6/20* | (2007.10) |

(52) U.S. Cl.
CPC .............. *B60W 20/108* (2013.01); *B60W 10/06* (2013.01); *B60W 10/08* (2013.01); *B60W 20/00* (2013.01); *B60K 6/20* (2013.01); *Y02T 10/7077* (2013.01); *B60W 2600/00* (2013.01); *Y10S 903/93* (2013.01); *B60L 11/08* (2013.01); *B60L 11/1861* (2013.01); *B60L 15/20* (2013.01); *Y02T 10/7044* (2013.01); *Y02T 10/7005* (2013.01); *Y02T 10/705* (2013.01); *B60W 2710/08* (2013.01); *B60K 6/445* (2013.01); *B60W 20/10* (2013.01); *Y02T 10/7275* (2013.01); *Y02T 10/6239* (2013.01); *Y02T 10/70* (2013.01)

(58) Field of Classification Search
None
See application file for complete search history.

(56) References Cited

U.S. PATENT DOCUMENTS

| | | | |
|---|---|---|---|
| 2006/0170383 A1* | 8/2006 | Narumi et al. | 318/254 |
| 2006/0254837 A1* | 11/2006 | Andersson et al. | 180/65.3 |
| 2008/0129237 A1* | 6/2008 | Atarashi et al. | 318/492 |
| 2009/0205890 A1* | 8/2009 | Diegelmann et al. | 180/65.275 |
| 2009/0316741 A1* | 12/2009 | Watanabe | 372/34 |
| 2010/0001523 A1* | 1/2010 | Sato et al. | 290/31 |
| 2010/0052588 A1 | 3/2010 | Okamura et al. | |
| 2011/0093151 A1 | 4/2011 | Kojima et al. | |
| 2013/0060412 A1* | 3/2013 | Nakagawara et al. | 701/22 |

FOREIGN PATENT DOCUMENTS

| | | |
|---|---|---|
| JP | 2006-194133 A | 7/2006 |
| JP | 2007-098981 A | 4/2007 |
| JP | 2008-301598 A | 12/2008 |
| JP | 2010-006296 A | 1/2010 |
| JP | 2010-200541 A | 9/2010 |

* cited by examiner

*Primary Examiner* — Calvin Cheung
(74) *Attorney, Agent, or Firm* — Kenyon & Kenyon LLP

(57) ABSTRACT

When a determination is made that the running mode is an HV running mode at S10, an ECU sets the system voltage for an HV running mode. When a determination is made that the running mode is an EV running mode at S10, the ECU sets the system voltage for an EV running mode. The setting of the system voltage for an EV running mode is lower than the setting for an HV running mode.

13 Claims, 14 Drawing Sheets

HYBRID VEHICLE AND CONTROL METHOD THEREOF

CROSS REFERENCE TO RELATED APPLICATION

This is a national phase application based on the PCT International Patent Application No. PCT/JP2011/052244 filed on Feb. 3, 2011, the entire contents of which are incorporated herein by reference.

TECHNICAL FIELD

The present invention relates to a hybrid vehicle and a control method thereof, particularly a hybrid vehicle including a boost converter between a power storage device and an electric motor, and a method of controlling the hybrid vehicle.

BACKGROUND ART

Attention is directed to hybrid vehicles as environment-friendly vehicles. A hybrid vehicle incorporates a power storage device, an inverter, and an electric motor driven by the inverter, in addition to a conventional engine, as the power source for traction. Some of such hybrid vehicles are known to have the engine stopped and allow running using only the motor. A running mode with the engine stopped is referred to as "EV (Electric Vehicle) running mode", whereas a running mode using the engine and motor with the engine is operated is referred to as "HV (Hybrid Vehicle) running mode".

There is also known an electric powered vehicle mounted with a motor as a power source, including, between the power storage device and an inverter driving the motor, a boost converter boosting the voltage supplied to the inverter (hereinafter, also referred to as "system voltage") to a level greater than or equal to the voltage of the power storage device.

Japanese Patent Laying-Open No. 2008-301598 (PTD 1) discloses a vehicle including such a boost converter. The vehicle is provided with an economic mode switch for the user to select economical running. When the economic mode switch is turned ON, the system voltage is restricted. Accordingly, worthless power consumption can be reduced (refer to PTD 1).

CITATION LIST

Patent Document

PTD 1: Japanese Patent Laying-Open No. 2008-301598
PTD 2: Japanese Patent Laying-Open No. 2006-194133

SUMMARY OF INVENTION

Technical Problem

The technique disclosed in the aforementioned Japanese Patent Laying-Open No. 2008-301598 is advantageous in that fuel economy can be improved by providing an economic mode switch to restrict the system voltage. However, the setting of the system voltage and measures for improving the fuel economy in a hybrid vehicle is not particularly studied.

In view of the foregoing, an object of the present invention is to improve the fuel economy in a hybrid vehicle by appropriate setting of the system voltage.

Solution to Problem

A hybrid vehicle according to the present invention includes an internal combustion engine and an electric motor generating vehicle driving force, a power storage device, a driving device driving the electric motor, a voltage conversion device, and a control device controlling the voltage conversion device. The voltage conversion device is provided between the driving device and the power storage device, and configured to boost an input voltage of the driving device (system voltage) to a level higher than the voltage of the power storage device. The control device modifies, in a first running mode (EV running mode) running with the internal combustion engine stopped, the setting of the system voltage, as compared to the setting of the system voltage for a second running mode (HV running mode) running using the internal combustion engine and the electric motor with the internal combustion engine operated.

Preferably, the control device sets, in the first running mode, the input voltage with a tendency to become lower than the input voltage for the second running mode.

Preferably, the control device modifies, in the first running mode, a setting of an upper limit of the system voltage, as compared to the setting of the upper limit for the second running mode.

Preferably, the control device sets, in the first running mode, the input voltage lower than the input voltage for the second running mode having an identical operating state of the electric motor generating vehicle driving force.

Preferably, the control device modifies the setting of the system voltage, in a first driving mode (CD mode) giving priority to running with the internal combustion engine stopped, as compared to the setting of the system voltage for a second driving mode (CS mode) maintaining a charging state of the power storage device by generating electric power using the internal combustion engine.

Preferably, the hybrid vehicle further includes an input device for a driver to select one of a normal mode and an economic mode. The control device modifies the setting of the system voltage to a level less than or equal to the setting for the normal mode, when the economic mode is selected through the input device. A rate of decrease of the system voltage when the economic mode is selected in the first running mode is greater than the rate of decrease when the economic mode is selected in the second running mode.

Preferably, the control device further modifies the setting of the system voltage according to a rotational speed of the electric motor in each of the first running mode and second running mode.

Also preferably, the control device further modifies the setting of the system voltage according to the vehicle driving force in each of the first running mode and second running mode.

Also preferably, the control device further modifies the setting of the system voltage according to an output of the electric motor in each of the first running mode and second running mode.

Preferably, the hybrid vehicle further includes a power generator driven by the internal combustion engine to generate electric power, and capable of feeding electric power to the power storage device, in a power running operation of the electric motor.

The present invention is also directed to a control method of a hybrid vehicle. The hybrid vehicle includes an internal combustion engine and an electric motor generating vehicle driving force, a power storage device, a driving device driving the electric motor, and a voltage conversion device. The voltage conversion device is provided between the driving device and the power storage device, and configured to boost an input voltage of the driving device (system voltage) to a level higher than the voltage of the power storage device. The control method includes a first step of setting the system voltage for a first running mode (EV running mode) running with the internal combustion engine stopped, and a second step of setting the system voltage for a second running mode (HV running mode) running using the internal combustion engine and the electric motor with the internal combustion engine operated.

Preferably, the input voltage for the first running mode is set with a tendency to become lower than the input voltage for the second running mode.

Preferably, the first step includes the step of setting an upper limit of the system voltage for the first running mode. The second step includes the step of setting the upper limit of the system voltage for the second running mode.

Preferably, the input voltage for the first running mode is set lower than the input voltage for the second running mode having an identical operating state of the electric motor generating vehicle driving force.

Preferably, the control method further includes the step of setting the system voltage for a first driving mode (CD mode) giving priority to running with the internal combustion engine stopped. The first and second steps are executed in a second driving mode (CS mode) maintaining a charging state of the power storage device by generating electric power using the internal combustion engine.

Advantageous Effects of Invention

Since the setting of the input voltage of the driving device (system voltage) is modified in the first running mode (EV running mode), as compared to the setting of the input voltage in the second running mode (HV running mode) in the present invention, an appropriate system voltage taking into consideration the balance between fuel economy and driveability can be set for each running mode. According to the present invention, the fuel economy can be improved by setting an appropriate system voltage in a hybrid vehicle.

DESCRIPTION OF EMBODIMENTS

Figure 1:
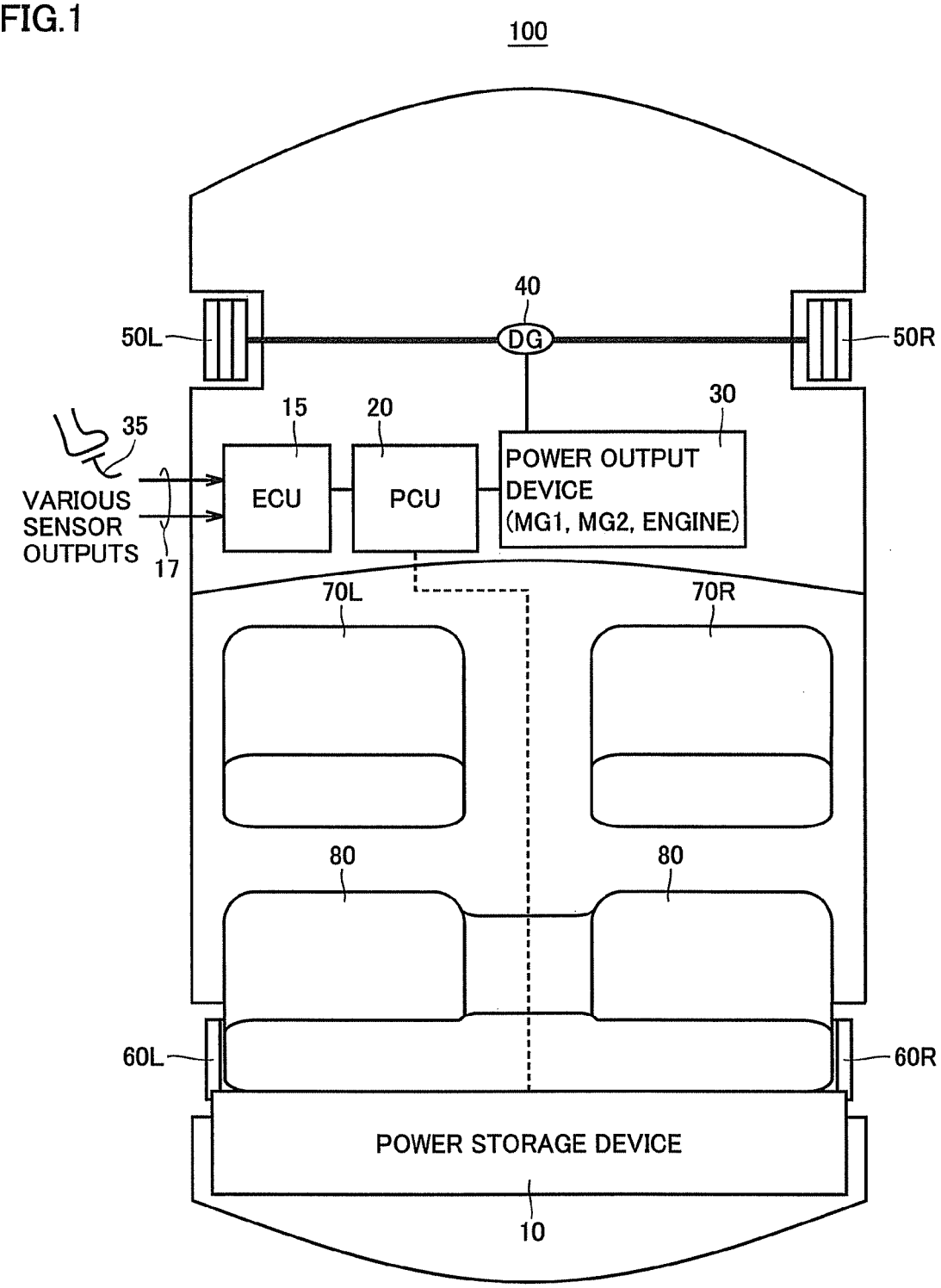
FIG. 1 is a block diagram representing an entire configuration of a hybrid vehicle according to a first embodiment.

Embodiments of the present invention will be described in detail with reference to the drawings. In the drawings, the same or corresponding elements have the same reference characters allotted, and description thereof will not be repeated.

First Embodiment

FIG. 1 is a block diagram representing an entire configuration of a hybrid vehicle according to a first embodiment. Referring to FIG. 1, a hybrid vehicle 100 includes a power storage device 10, an ECU (Electronic Control Unit) 15, a PCU (Power Control Unit) 20, a power output device 30, a differential gear 40, front wheel 50L and 50R, and rear wheels 60L and 60R.

Power storage device 10 is a rechargeable DC power source, formed of a secondary battery such as nickel-metal hydride or lithium ion. Power storage device 10 is disposed at a rear side region of a rear seat 80 for example, and electrically connected with PCU 20 to supply DC voltage thereto. Power storage device 10 receives electric power generated by power output device 30 from PCU 20 to be charged.

PCU 20 generically shows a power converter required in hybrid vehicle 100. PCU 20 includes a converter boosting the voltage supplied from power storage device 10, an inverter driving a motor generator included in power output device 30, and the like.

ECU 15 receives various sensor outputs 17 from various types of sensors indicating the driving state and vehicle state. Various sensor outputs 17 include the accelerator pedal position corresponding to the stepping amount on an accelerator pedal 35, the vehicle speed according to the revolution speed of the wheels, and the like. ECU 15 executes various control related to hybrid vehicle 100 based on such sensor outputs applied.

Power output device 30 is provided as the driving source of the wheels, and includes motor generators MG1 and MG2 and an engine. These components are mechanically coupled via a power split device (not shown). In accordance with the running state of hybrid vehicle 100, distribution and coupling of the driving force are implemented among the aforementioned three components via the power split device. As a result, front wheels 50L and 50R are driven. Differential gear 40 transmits the motive power output from power output device 30 to front wheels 50L and 50R, and transmits the rotational force from front wheels 50L and 50R to power output device 30. Accordingly, power output device 30 transmits the motive power from the engine and motor generator to front wheels 50L and 50R via differential gear 40 to drive front wheels 50L and 50R. Power output device 30 receives the rotational force of the motor generator by front wheels 50L and 50R to generate power and provide the generated power to PCU 20.

Motor generators MG1 and MG2 may function as a power generator and an electric motor. Motor generator MG1 operates mainly as a power generator, and motor generator MG2 operates mainly as an electric motor. Specifically, motor generator MG1 receives some of the output from the engine distributed by the power split device for generating power. Motor generator MG1 receives supply of electric power from power storage device 10 to operate as an electric motor for cranking up and starting the engine.

Motor generator MG2 is driven by at least one of the electric power stored at power storage device 10 and the electric power generated by motor generator MG1. The driving force of motor generator MG2 is transmitted to the driving shaft of front wheels 50L and 50R via differential gear 40. Accordingly, motor generator MG2 assists the engine for driving the vehicle, or for driving the vehicle by its own driving force alone. In a vehicle braking mode, motor generator MG2 is driven by front wheels 50L and 50R to operate as a power generator. At this stage, the electric power generated by motor generator MG2 charges power storage device 10 via PCU 20.

PCU 20 responds to a control instruction from ECU 15 to boost the DC voltage received from power storage device 10, and convert the boosted DC voltage into AC voltage to drive motor generators MG1 and MG2 in power output device 30. In a regenerative operation mode of motor generators MG1 and MG2, PCU 20 responds to a control instruction from ECU 15 to convert the AC voltage generated by motor generators MG1 and MG2 into DC voltage for charging power storage device 10.

Figure 2:
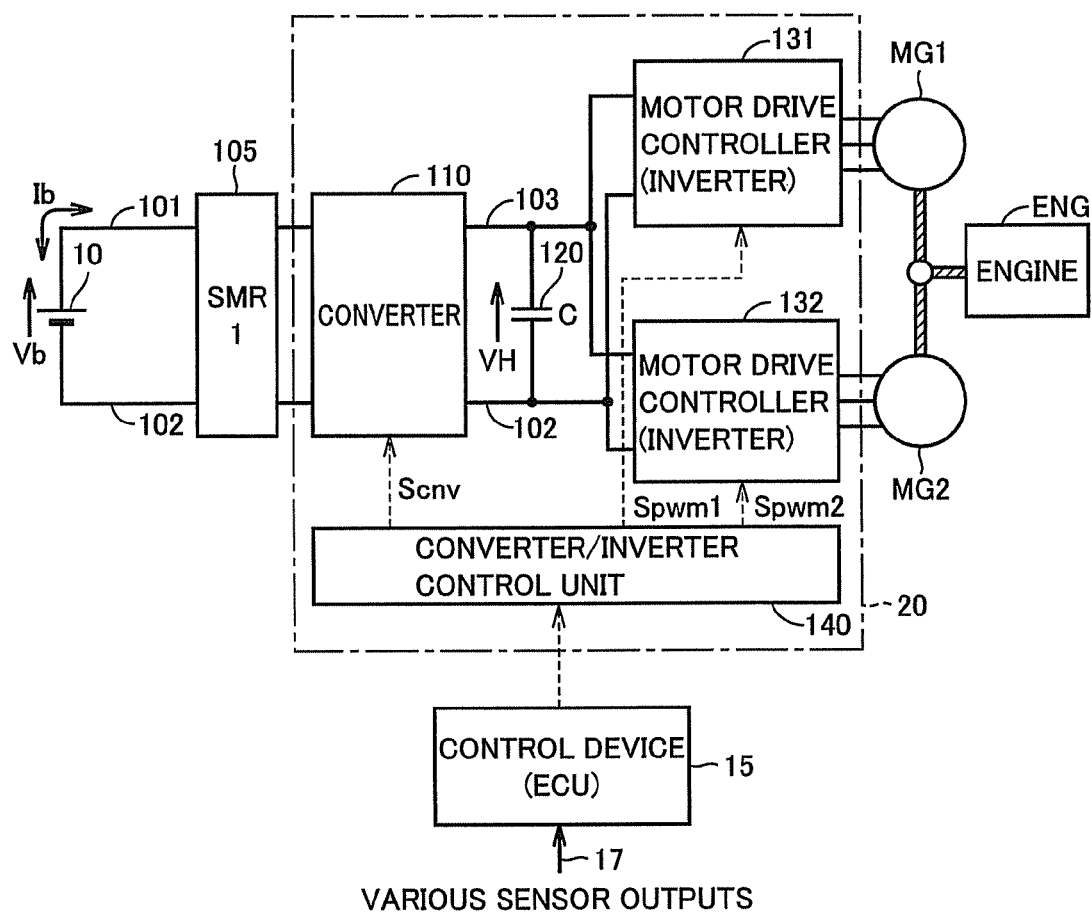
FIG. 2 is a block diagram representing a configuration of an electric system of a hybrid vehicle.

FIG. 2 is a block diagram representing a configuration of the electric system of hybrid vehicle 100. Referring to FIG. 2, the electric system includes power storage device 10, an SMR (System Main Relay) 105, PCU 20, motor generators MG1 and MG2, ECU 15, and ECU 15.

Motor generators MG1 and MG2 are connected to an engine ENG and driving wheels not shown (front wheels 50L and 50R of FIG. 1) via the power split device. Hybrid vehicle 100 can run using engine ENG and motor generator MG2. Motor generator MG1 starts engine ENG and generates electric power using the driving force of engine ENG.

SMR 105 is provided between power storage device 10 and PCU 20, and is set on in response to a command from ECU 15 in the event of a vehicle running.

PCU 20 includes a converter 110, a capacitor 120, motor drive controllers 131 and 132, and a converter/inverter control unit 140. In the first embodiment, motor generators MG1 and MG are AC motors, and motor drive controllers 131 and 132 are formed of inverters. Hereinafter, motor drive controller 131 (132) is also referred to as "inverter 131 (132)".

Converter 110 boosts a voltage VH between a positive line 103 and a negative line 102 (hereinafter, also referred to as "system voltage VH") to a level greater than or equal to voltage Vb of power storage device 10 based on control signal Scnv from converter/inverter control unit 140. Converter 110 is constituted of a current-reversible type boost chopper circuit.

Inverters 131 and 132 are provided corresponding to motor generators MG1 and MG2, respectively. Inverters 131 and 132 are connected to converter 110 parallel to each other for driving motor generators MG1 and MG2 based on control signals Spwm1 and Spwm2, respectively, from converter/inverter control unit 140.

Converter/inverter control unit 140 generates control signals Scnv, Spwm1 and Spwm2 for driving converter 110, motor generator MG1 and motor generator MG2, respectively, based on control command values received from ECU 15 (the setting of system voltage VH, the torque target value of motor generators MG1, MG2, and the like). Converter/inverter control unit 140 outputs the generated control signals Scnv, Spwm1 and Spwm2 to converter 110, inverter 131, and inverter 132, respectively.

ECU 15 is formed of an electronic control unit to carry out various control such as controlling the vehicle running mode, charging/discharging control of power storage device 10, setting of system voltage VH, and the like through software processing by executing a prestored program with a CPU (Central Processing Unit) and/or hardware processing by a dedicated electronic circuit. ECU 15 generates a control command to drive PCU 20, and provides the generated control command to converter/inverter control unit 140 of PCU 20.

Figure 3:
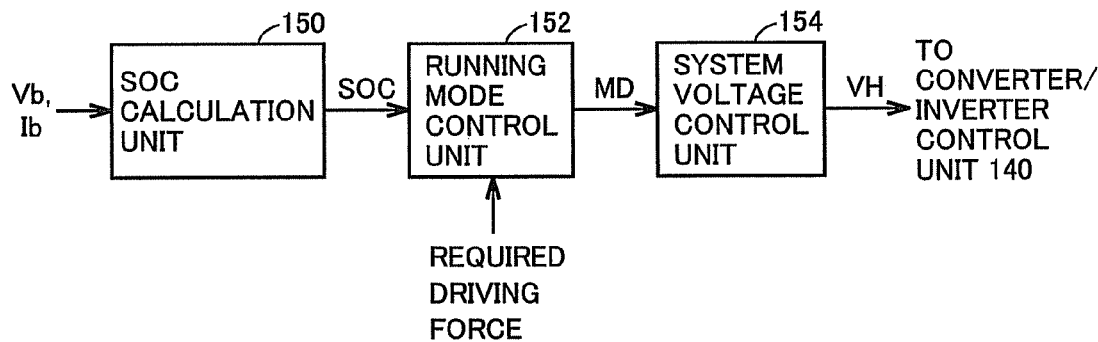
FIG. 3 is a functional block diagram of an ECU related to a system voltage setting.

FIG. 3 is a functional block diagram of ECU 15 related to the setting of system voltage VH. Referring to FIG. 3, ECU 15 includes an SOC calculation unit 150, a running mode control unit 152, and a system voltage control unit 154.

SOC calculation unit 150 calculates the SOC (State of Charge) indicating the charging state of power storage device 10 based on voltage Vb and current Ib of power storage device 10 detected by a sensor not shown. The SOC represents in 0-100% the stored amount relative to a fully charged state of power storage device 10, and indicates the remaining stored amount in power storage device 10. For the method of calculating this SOC, various well-known methods can be employed.

Running mode control unit 152 controls the switching of the vehicle running mode based on the SOC calculated by SOC calculation unit 150 and the vehicle required driving force. Specifically, running mode control unit 152 controls the switching of an EV running mode and HV running mode such that the SOC of power storage device 10 maintains a predetermined target. In the EV running mode, the vehicle runs with engine ENG stopped (that is, running using motor generator MG2 alone). In the HV running mode, engine ENG is operated and the vehicle runs using engine ENG and motor generator MG2.

Running mode control unit 152 sets the running mode at the EV running mode when the SOC exceeds the target. In contrast, when the SOC is lower than the target, running mode control unit 152 sets the running mode at the HV running mode to charge power storage device 10 by driving motor generator MG1 through engine ENG. Further, running mode control unit 152 switches the running mode to the HV running mode when the vehicle required driving force cannot be output with motor generator MG2 alone in an EV running mode. The required driving force is calculated based on the accelerator open position, the vehicle speed, and the like received as various sensor outputs 17 (FIG. 1).

System voltage control unit 154 receives a mode signal MD indicating the running mode from running mode control unit 152 to set system voltage VH based on the running mode. In other words, system voltage control unit 154 modifies, in the EV running mode, the setting of system voltage VH, as compared to that for the HV running mode. As will be described afterwards, a low setting of system voltage VH in an EV running mode, as compared to that for an HV running mode, is preferable from the standpoint of improving fuel economy.

If system voltage VH is high, the power loss at converter 110 and inverters 131 and 132 (FIG. 2) is increased, resulting in degradation in the fuel economy. Since the control range of the revolution speed and torque of motor generator MG2 generating vehicle driving force is restricted in an EV running mode (engine ENG is started to shift to an HV running mode when the revolution speed and/or torque is increased), it is not necessary to have system voltage VH increased in view of the high power output of motor generator MG2. Thus, the first embodiment is directed to improving the fuel economy by modifying the setting of system voltage VH for an EV running mode lower as compared to that for an HV running mode.

It is to be noted that system voltage VH is set lower than the maximum value even in an HV running mode for the purpose of improving the fuel economy, unless the accelerator pedal is stepped on exceeding a predetermined level. Here, system voltage VH for an HV running mode is restricted by the revolution speed and the like of motor generator MG1 that operates as a power generator. Therefore, in an HV running mode, system voltage VH cannot be set as low as the level set for an EV running mode immune to the restriction of the revolution speed and the like of motor generator MG1.

Then, system voltage control unit 154 outputs the setting of system voltage VH to converter/inverter control unit 140 (FIG. 2) of PCU 20.

Figure 4:
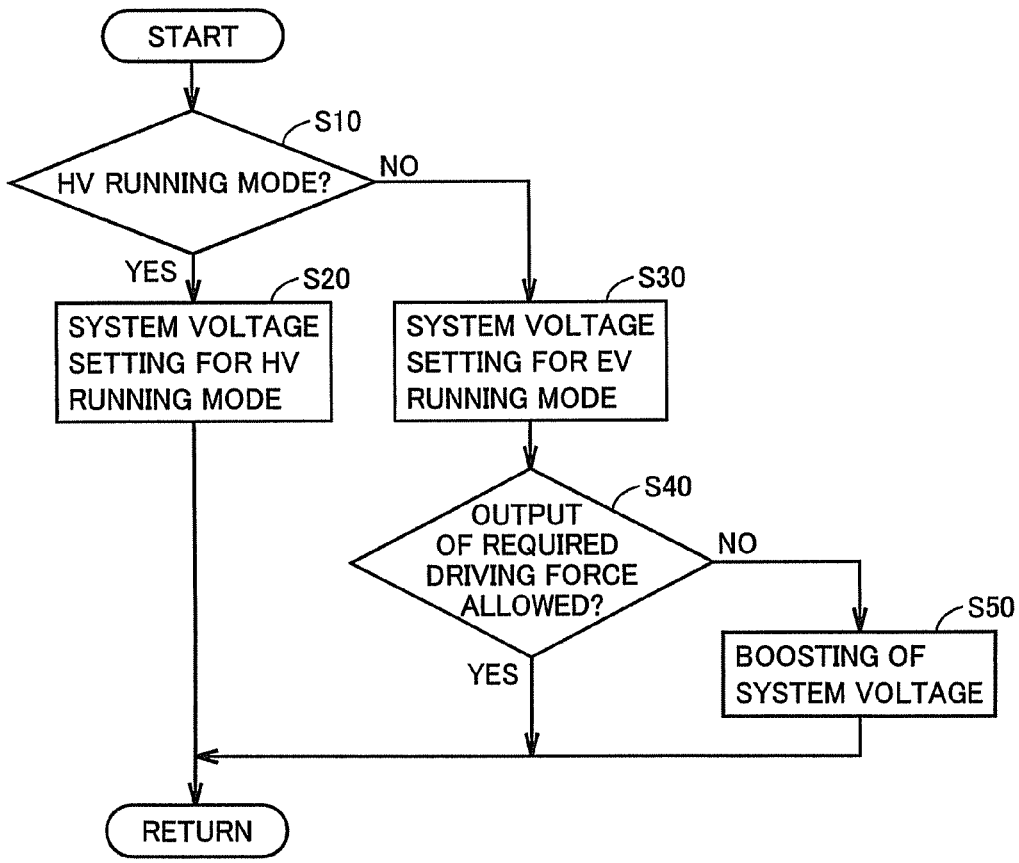
FIG. 4 is a flowchart to describe a series of procedures related to a system voltage setting process.

FIG. 4 is a flowchart to describe a series of procedures related to the setting process of system voltage VH. The procedure in the flowchart is invoked from the main routine to be executed at every predetermined time interval or every time a prescribed condition is met.

Referring to FIG. 4, ECU 15 determines whether the running mode is an HV running mode or not (step S10). Step S10 is directed to the procedure for determining the running mode, and a determination may be made based on whether the running mode is an EV running mode or not.

When a determination is made that the running mode is an HV running mode at step S10 (YES at step S10), ECU 15 sets system voltage VH at a value for an HV running mode (step S20). When a determination is made that the running mode is an EV running mode at step S10 (NO at step S10), ECU 15 sets system voltage VH at a value for an EV running mode (step S30). The setting for an EV running mode is lower than the setting for an HV running mode.

ECU 15 determines whether the vehicle required driving force can be output from motor generator MG2 with the setting of system voltage VH for an EV running mode (step S40). When a determination is made that motor generator MG2 cannot output the required driving force (NO at step S40), ECU 15 boosts the setting of system voltage VH such that motor generator MG2 can output the required driving force (step S50).

In an EV running mode, system voltage VH may be set lower than that for an HV running mode having the identical operating state (torque and rotational speed) of motor generator MG2 generating the vehicle driving force. For example, assuming that system voltage VH is determined by a map or the like based on the operating state of motor generator MG2 and preparing different maps for an EV running mode and HV running mode, the values in the map for an EV running mode may entirely be set smaller than the values in the map for an HV running mode.

Thus, since the setting of system voltage VH is modified in an EV running mode relative to the setting for an HV running mode in the first embodiment, an appropriate system voltage VH taking into account the balance between fuel economy and driveability can be set for every running mode. According to the first embodiment, fuel economy can be improved by setting system voltage VH appropriately.

Modification of First Embodiment

Although the above-described first embodiment is based on the case where system voltage VH is changed according to the running mode, the upper limit of system voltage VH, not system voltage VH per se, may be switched according to the running mode. In this case, system voltage VH per se is calculated based on the drive required for motor generators MG1 and MG2, independent of the running mode.

In the present modification, ECU 15 sets the upper limit of system voltage VH based on a running mode. In other words, ECU 15 modifies, in an EV running mode, the upper limit setting of system voltage VH, as compared to that for an HV running mode. In an EV running mode, the upper limit of system voltage VH is set lower than that for an HV running mode preferably from the standpoint of improving the fuel economy, as will be described below.

Since the EV running mode is not subject to restriction of the revolution speed and the like of motor generator MG1 as in an HV running mode, the upper limit of system voltage VH can be set lower as compared to that for an HV running mode, as set forth above. Accordingly, system voltage VH in an EV running mode can be set low, allowing the fuel economy to be improved, as described in the first embodiment. Furthermore, by reducing the upper limit setting of system voltage VH in an EV running mode, motor generator MG2 can be driven in a control mode of high voltage usage. This contributes to the effect of improving the fuel economy.

Figure 5:
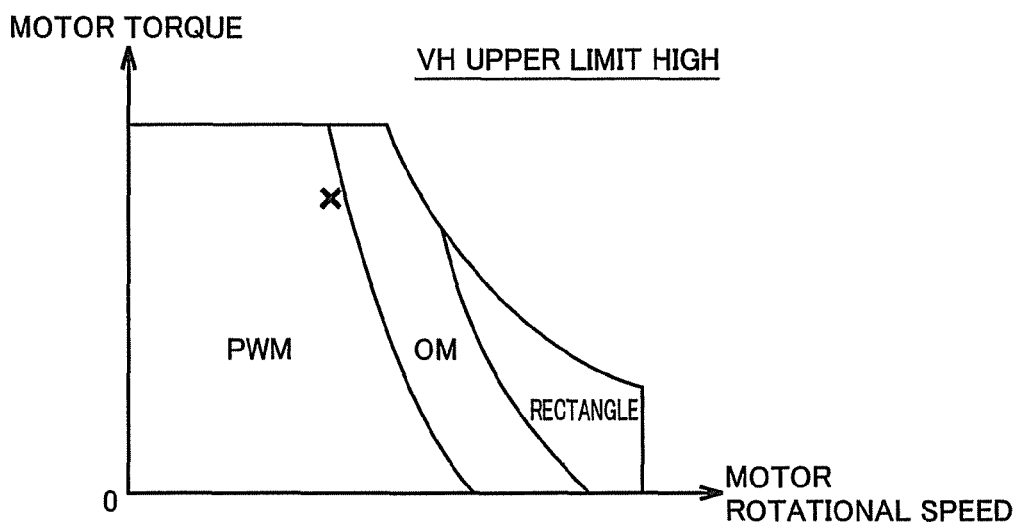
FIG. 5 is a diagram representing the control mode division when the system voltage upper limit setting is relatively high.
Figure 6:
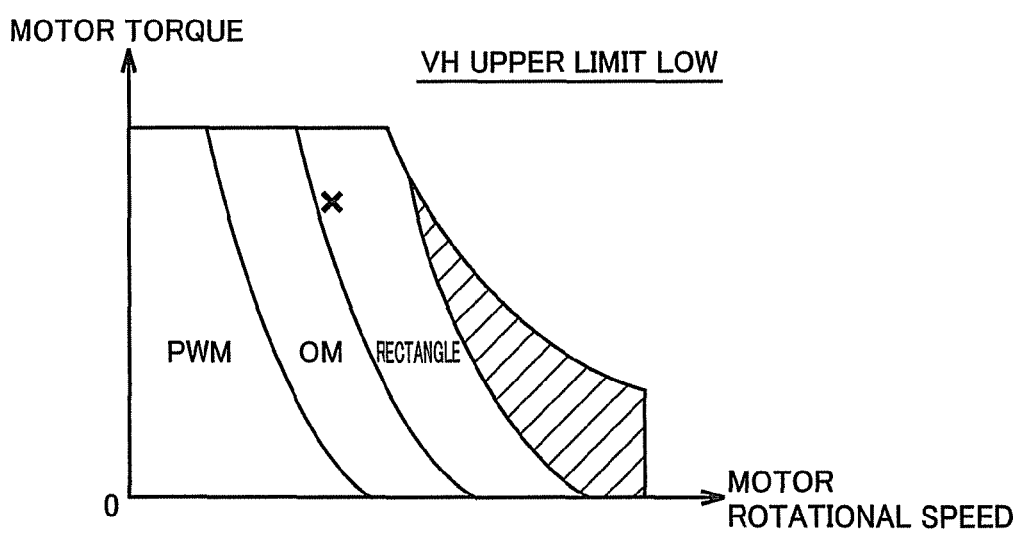
FIG. 6 is a diagram representing the control mode division when the system voltage upper limit setting is relatively low

FIGS. 5 and 6 represent the rotational speed-torque characteristics of motor generator MG2. FIG. 5 represents the control mode division when the upper limit setting of system voltage VH is relatively high, whereas FIG. 6 represents the control mode division when the upper limit setting of system voltage VH is relatively low.

Referring to FIGS. 5 and 6, the region indicated as "PWM" is where sinusoidal wave PWM (Pulse Width Modulation) control is effected; and the region indicated by "OM" is where overmodulation PWM control is effected. The region indicated by "rectangle" is where rectangular wave voltage control is effected. Although the controllability of motor generator MG2 is good in sinusoidal wave PWM control, the modulation factor (the fundamental wave component (effective value) ratio of the motor applied voltage to voltage VH) can be raised only up to approximately 0.61. In overmodulation PWM control, the modulation factor can be increased up to the range of 0.78 from the highest modulation factor in the sinusoidal wave PWM control mode. Under rectangular wave voltage control, the modulation factor is constant at the highest level of 0.78. The shaded region in FIG. 6 is where motor generator MG2 cannot provide an output due to the low system voltage VH.

As shown in FIGS. 5 and 6, even at a point where sinusoidal wave PWM control is carried out in the case where the upper limit setting of system voltage VH is high, motor generator MG2 can be driven under rectangular wave voltage control of high modulation factor (voltage usability) by lowering the upper limit setting of system voltage VH.

Also in an HV running mode, the upper limit of system voltage VH is set lower than the highest value in order to improve the fuel economy, unless the accelerator pedal is stepped on exceeding a predetermined level. It is to be noted that system voltage VH in an HV running mode is restricted by the revolution speed and the like of motor generator MG1, as described above. Therefore, in an HV running mode, the upper limit of system voltage VH cannot be set as low as the level set for an EV running mode immune to the restriction of the revolution speed and the like of motor generator MG1.

Figure 7:
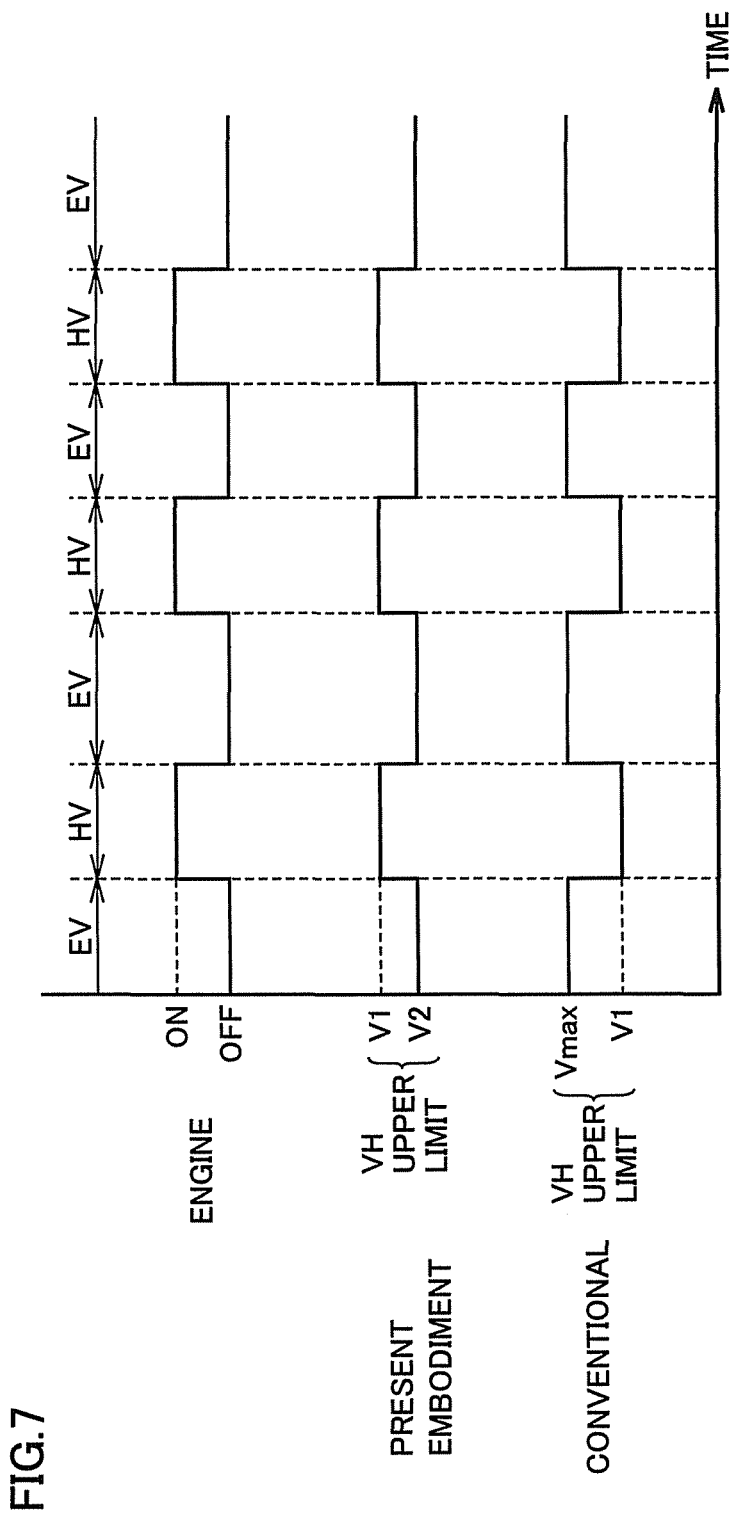
FIG. 7 represents a change in the system voltage upper limit setting in association with a change in the running mode.

FIG. 7 represents a change in the upper limit setting of system voltage VH in association with a change in the running mode. FIG. 7 also represents the change in the upper setting of system voltage VH in conventional art, by way of comparison.

Referring to FIG. 7, the upper limit of system voltage VH for an EV running mode is set to a low value (V2) as compared to the value for an HV running mode in the present embodiment. In contrast, the concept of lowering the upper limit setting of system voltage VH in an EV running mode from the highest value (Vmax) was absent from conventional art. Therefore, the level set for an HV running mode having the upper limit of system voltage VH restricted in order to improve the fuel economy is set lower than the level directed to an EV running mode.

Thus, likewise with the modification of the first embodiment, the fuel economy can be improved in a modification of the first embodiment.

Second Embodiment

Figure 8:
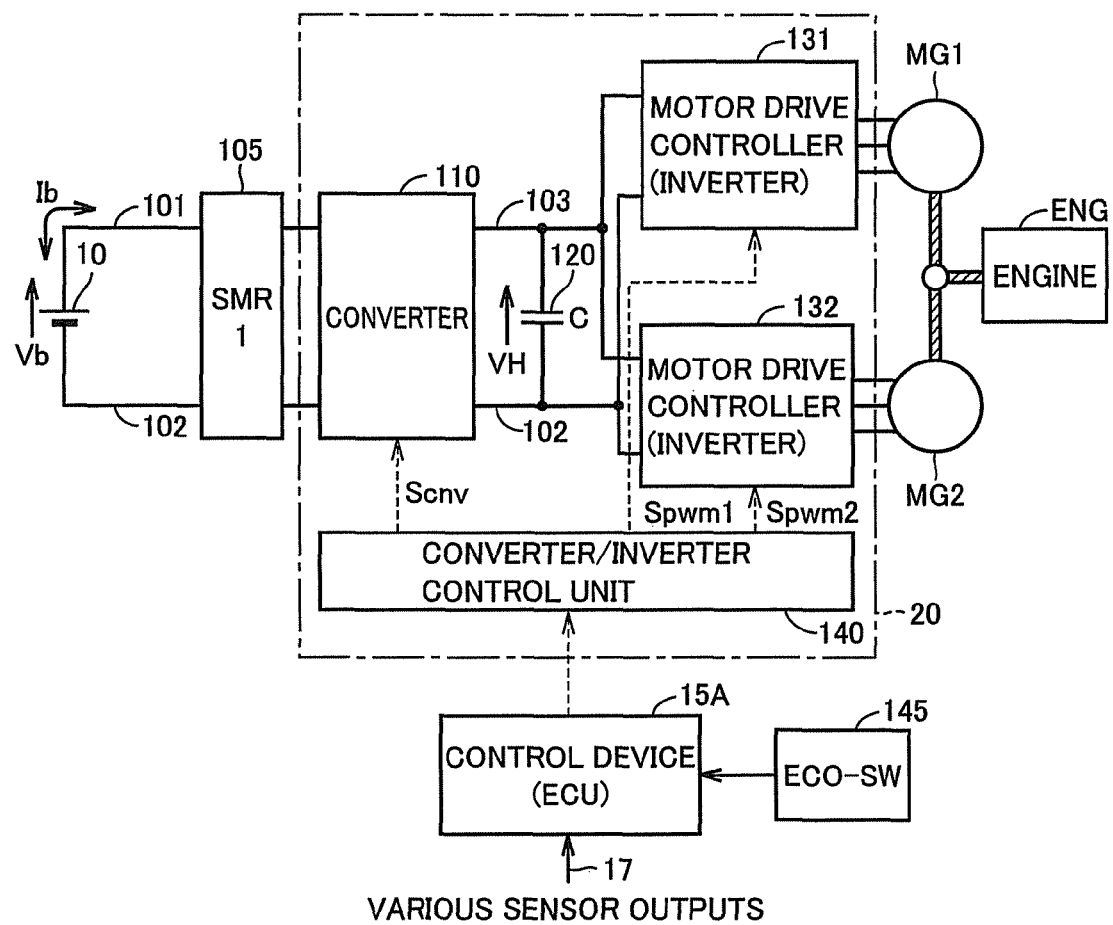
FIG. 8 is a block diagram representing a structure of an electric system of a hybrid vehicle according to a second embodiment.

FIG. 8 is a block diagram representing a configuration of an electric system of a hybrid vehicle according to a second embodiment. Referring to FIG. 8, the hybrid vehicle of the second embodiment further includes, based on the configuration of hybrid vehicle 100 shown in FIG. 2, an economic mode switch 145, and an ECU 15A instead of ECU 15.

Economic mode switch 145 is a switch for the driver to select either a normal mode or an economic mode. When economic mode switch 145 is turned ON, the economic mode is selected. In an EV running mode during an ON state of economic mode switch 145, ECU 15A lowers the setting of system voltage VH than that set for an OFF state of economic mode switch 145 (normal mode). Accordingly, the user can select whether to give priority to improving the fuel economy or driveability during an EV running mode. The remaining function of ECU 15A is identical to that of ECU 15 of the first embodiment.

Figure 9:
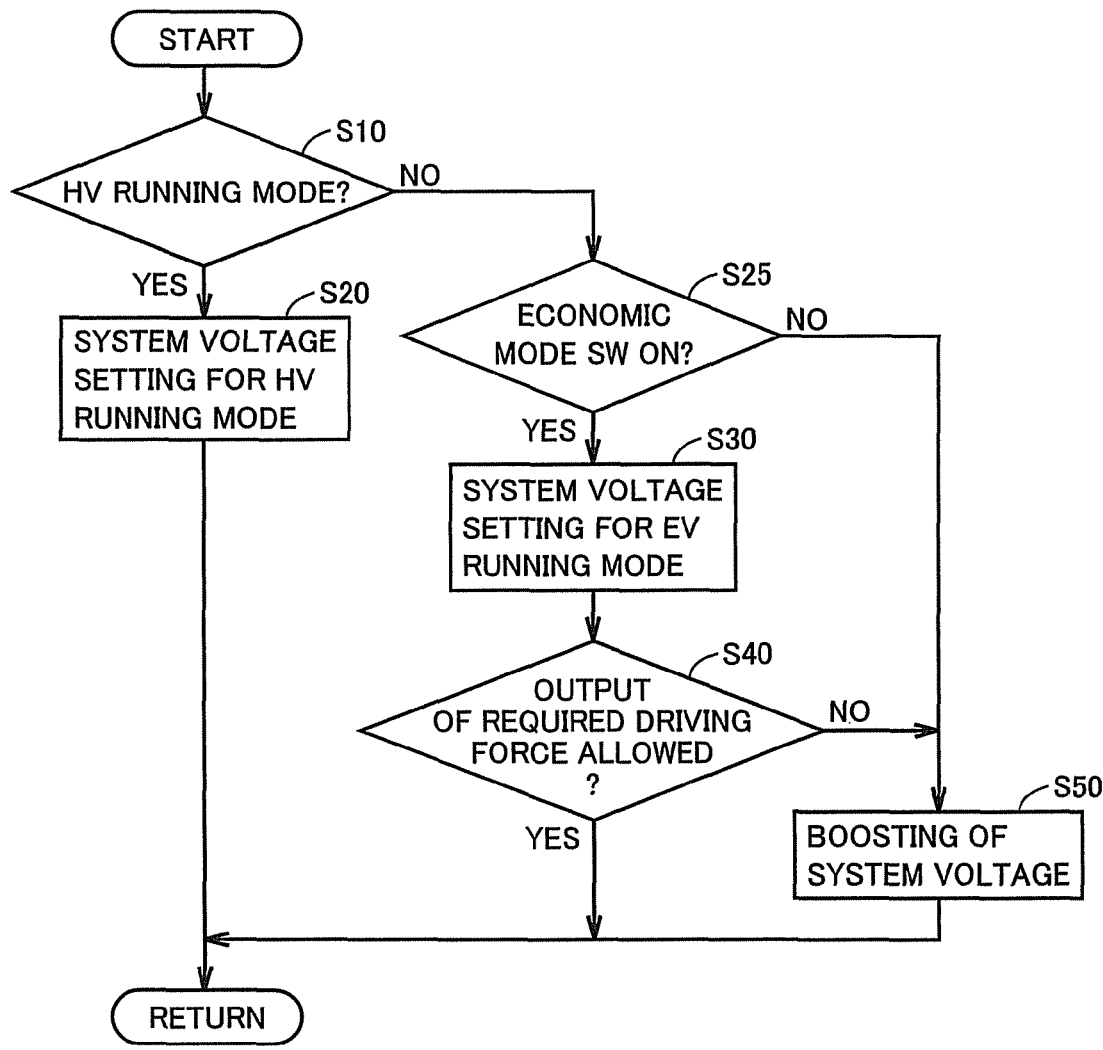
FIG. 9 is a flowchart to describe a series of procedures related to a system voltage setting process according to the second embodiment.

FIG. 9 is a flowchart to describe the series of procedures related to the setting process of system voltage VH in the second embodiment. The procedure in the flowchart is invoked from the main routine to be executed at every predetermined time interval or every time a prescribed condition is met.

Referring to FIG. 9, the flowchart further includes, based on the flowchart shown in FIG. 4, step S25. Specifically, when a determination is made that the running mode is an EV running mode at step S10 (NO at step S10), ECU 15A determines whether economic mode switch 145 is set ON or not (step S25).

When a determination is made that economic mode switch 145 is ON (YES at step S25), control proceeds to step S30 where ECU 15A sets system voltage VH at a value for an EV running mode. In contrast, when a determination is made that economic mode switch 145 is OFF at step S25 (NO at step S25), control proceeds to step S50 for ECU 15A.

Alternatively, another system voltage VH may be set instead of proceeding to step S50 when a determination is made that economic mode switch 145 is OFF at step S25. Similarly in this case, system voltage VH is set at a level higher than the voltage set at step S30.

The above description is based on the case where the setting of system voltage VH is not modified particularly in response to the ON/OFF of economic mode switch 145 in an HV running mode. However, the setting of system voltage VH may be lowered even in an HV running mode when economic mode switch 145 is turned ON, as compared to that when economic mode switch 145 is OFF (in a normal mode). However, since system voltage VH for an HV running mode is restricted by the revolution speed and the like of motor generator MG1, as set forth above, the setting of system voltage VH for an HV running mode cannot be lowered as that for an EV running mode. Therefore, the rate of decrease of system voltage VH when economic mode switch 145 is turned ON during an HV running mode is preferably smaller than the rate of decrease when economic mode switch 145 is turned ON during an EV running mode. In other words, the rate of reduction of system voltage VH when economic mode switch 145 is turned ON in an EV running mode is greater than the rate of decrease when economic mode switch 145 is turned ON in an HV running mode according to the second embodiment.

Although not particularly depicted, the upper limit of system voltage VH may be set lower in an EV running mode on the occasion of economic mode switch 145 being ON than that when economic mode switch 145 is OFF (in a normal mode) according to the second embodiment, likewise with the modification of the first embodiment.

According to the second embodiment, the provision of economic mode switch 145 operable by the driver allows the driver to select the priority between improvement in fuel economy and driveability.

Third Embodiment

Figure 10:
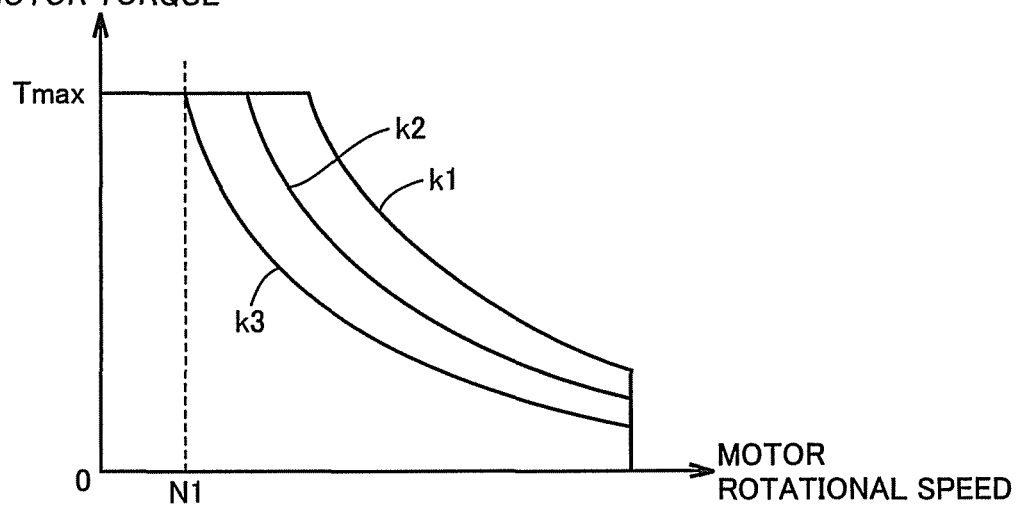
FIG. 10 represents the speed-torque characteristics of a motor generator.

FIG. 10 represents the speed-torque characteristics of motor generator MG2. Referring to FIG. 10, curves k1 to k3 represent the characteristics when system voltage VH is V1 to V3, respectively (V1>V2>V3).

As shown in FIG. 10, the maximum torque that can be output by motor generator MG2 is Tmax at most, despite a change in system voltage VH. Therefore, the maximum torque of motor generator MG2 can be output if system voltage VH is boosted up to V3 (curve k3) when the motor revolution speed is less than or equal to N1, for example. Any boosted voltage higher than V3 can be said to be worthless.

In the third embodiment, fuel economy is improved by modifying the setting of system voltage VH according to the rotational speed of motor generator MG2 generating vehicle driving force to avoid worthless boosted voltage.

The configuration of the hybrid vehicle according to the third embodiment is identical to that of hybrid vehicle 100 of the first embodiment shown in FIGS. 1 and 2.

Figure 11:
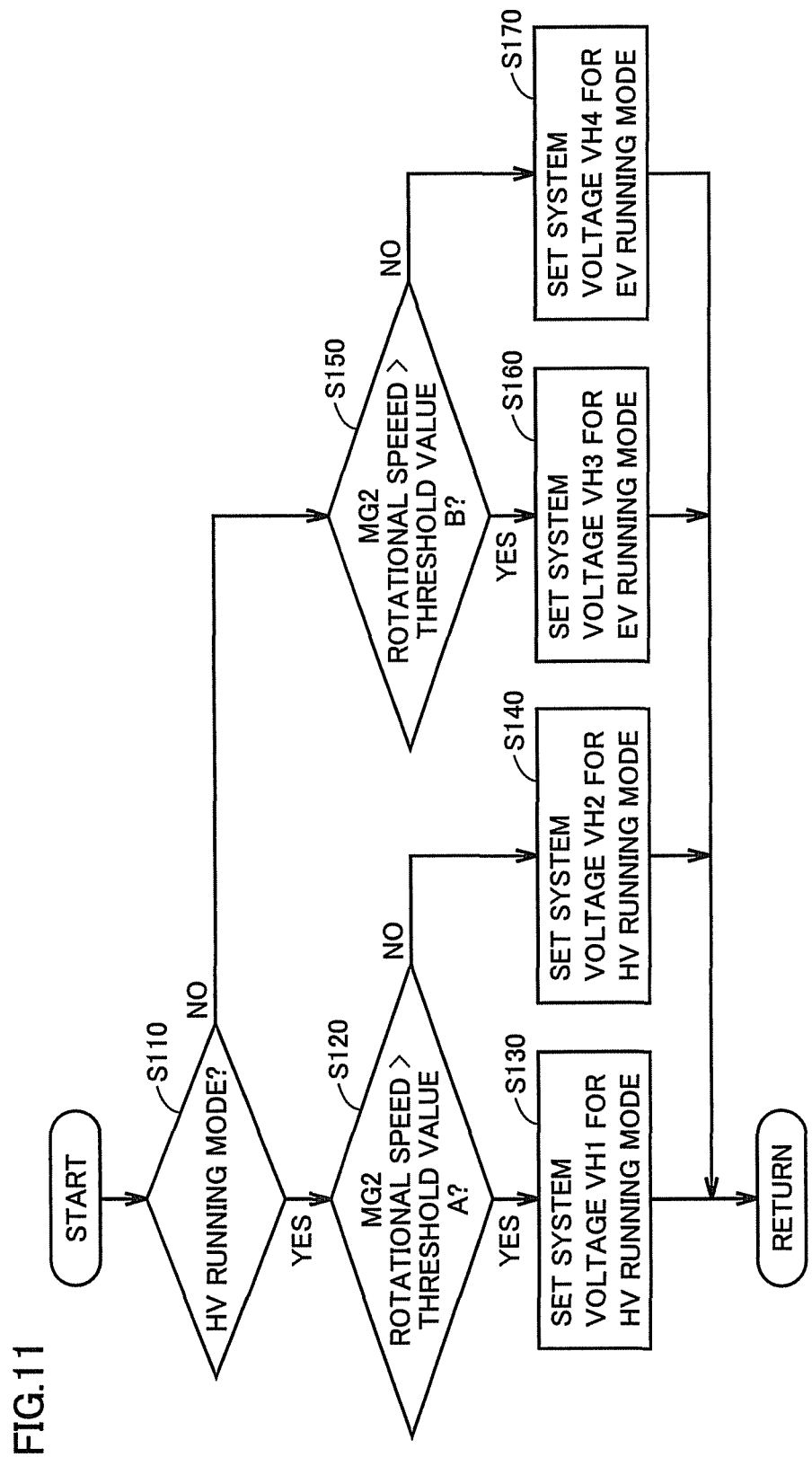
FIG. 11 is a flowchart to describe a series of procedures related to a system voltage setting process according to a third embodiment.

FIG. 11 is a flowchart to describe a series of procedures related to a setting process of system voltage VH according to a third embodiment. The procedure in the flowchart is invoked from the main routine to be executed at every predetermined time interval or every time a prescribed condition is met.

Referring to FIG. 11, ECU 15 determines whether the running mode is an HV running mode or not (step S110). Step S110 is directed to the procedure for determining the running mode, and a determination may be made based on whether the running mode is an EV running mode or not.

When a determination is made that the running mode is an HV running mode at step S110 (YES at step S110), ECU 15 determines whether the rotational speed of motor generator MG2 is higher than a predetermined threshold value A (step S120). When a determination is made that the rotational speed of motor generator MG2 is higher than threshold value A (YES at step S120), ECU 15 sets system voltage VH at a first value VH1 for an HV running mode (step S130). In contrast, when a determination is made that the rotational speed of motor generator MG2 is less than or equal to threshold value A (NO at step S120), ECU 15 sets system voltage VH at a second value VH2 (<VH1) for an HV running mode (step S130).

When a determination is made that the running mode is an EV running mode at step S110 (NO at step S110), ECU 15 determines whether the rotational speed of motor generator MG2 is higher than a predetermined threshold value B (step S150). When a determination is made that the rotational speed of motor generator MG2 is higher than threshold value B (YES at step S150), ECU 15 sets system voltage VH at a first value VH3 for an EV running mode (step S160). When a determination is made that the rotational speed of motor generator MG2 is less than or equal to threshold value B (NO at step S150), ECU 15 sets system voltage VH at a second value VH4 (<VH3) for an EV running mode (step S170).

Although the above description is based on the case where the setting of system voltage VH is divided into two stages for each running mode, the setting of system voltage VH may be made in more stages according to the rotational speed of motor generator MG2, or system voltage VH may be modified as a function of the rotational speed.

Further, the setting of system voltage VH may be modified according to the vehicle running speed, instead of the rotational speed of motor generator MG2.

Furthermore, likewise with the modification of the first embodiment, the upper limit setting of system voltage VH may be modified according to the rotational speed of motor generator MG2 for each running mode in the third embodiment.

Thus, since the setting of system voltage VH is variable according to the rotational speed of motor generator MG2 in the third embodiment, the fuel economy can be improved by avoiding worthless boosted voltage.

Modification 1 of Third Embodiment

Modification 1 is directed to modifying the setting of system voltage VH according to the vehicle driving force, instead of the rotational speed of motor generator MG2 or the vehicle speed.

Figure 12:
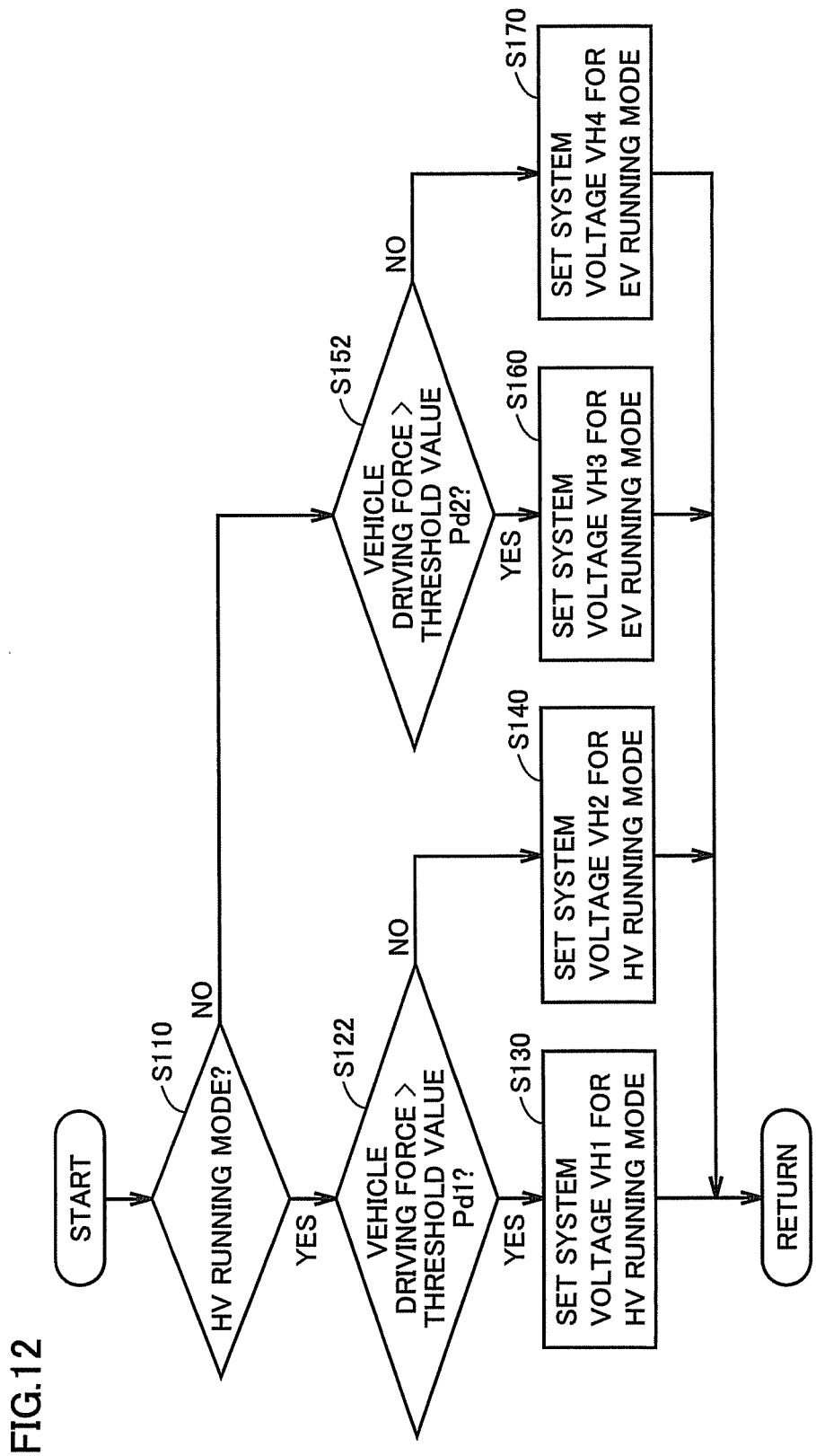
FIG. 12 is a flowchart to describe a series of procedures related to a system voltage setting process according to Modification 1 of the third embodiment.

FIG. 12 is a flowchart to describe a series of procedures related to a setting process of system voltage VH according to Modification 1 of the third embodiment. The procedure in the flowchart is invoked from the main routine to be executed at every predetermined time interval or every time a prescribed condition is met.

Referring to FIG. 12, the flowchart includes, based on the flowchart of FIG. 11, steps S122 and S152 instead of steps S120 and S150, respectively. When a determination is made that the running mode is an HV running mode at step S110 (YES at step S110), ECU 15 determines whether the vehicle driving force is greater than a predetermined threshold value Pd1 (step S22). For the vehicle driving force, a required driving force calculated based on the accelerator opening position, vehicle speed, and the like can be employed.

When a determination is made that the vehicle driving force is greater than a threshold value Pd1 (YES at step S122), control proceeds to step S130 where system voltage VH is set at first value VH1 for an HV running mode. In contrast, when a determination is made that the vehicle driving force is less than or equal to threshold value Pd1 (NO at step S122), control proceeds to step S140 where system voltage VH is set at second value VH2 (<VH1) for an HV running mode.

When a determination is made that the running mode is an EV running mode at step S110 (NO at step S110), ECU 15 determines whether the vehicle driving force is greater than a predetermined threshold value Pd2 (step S152). When a determination is made that the vehicle driving force is greater than threshold value Pd2 (YES at step S152), control proceeds to step S160 where system voltage VH is set at first value VH3 for an EV running mode. When a determination is made that the vehicle driving force is less than or equal to threshold value Pd2 (NO at step S152), control proceeds to step S170 where system voltage VH is set at second value VH4 (<VH3) for an EV running mode.

Advantages similar to those of the third embodiment are obtained in Modification 1.

Modification 2 of Third Embodiment

Modification 2 is directed to modifying the setting of system voltage VH according to the output (power) of motor generator MG2, instead of the rotational speed of motor generator MG2 or the vehicle speed.

Figure 13:
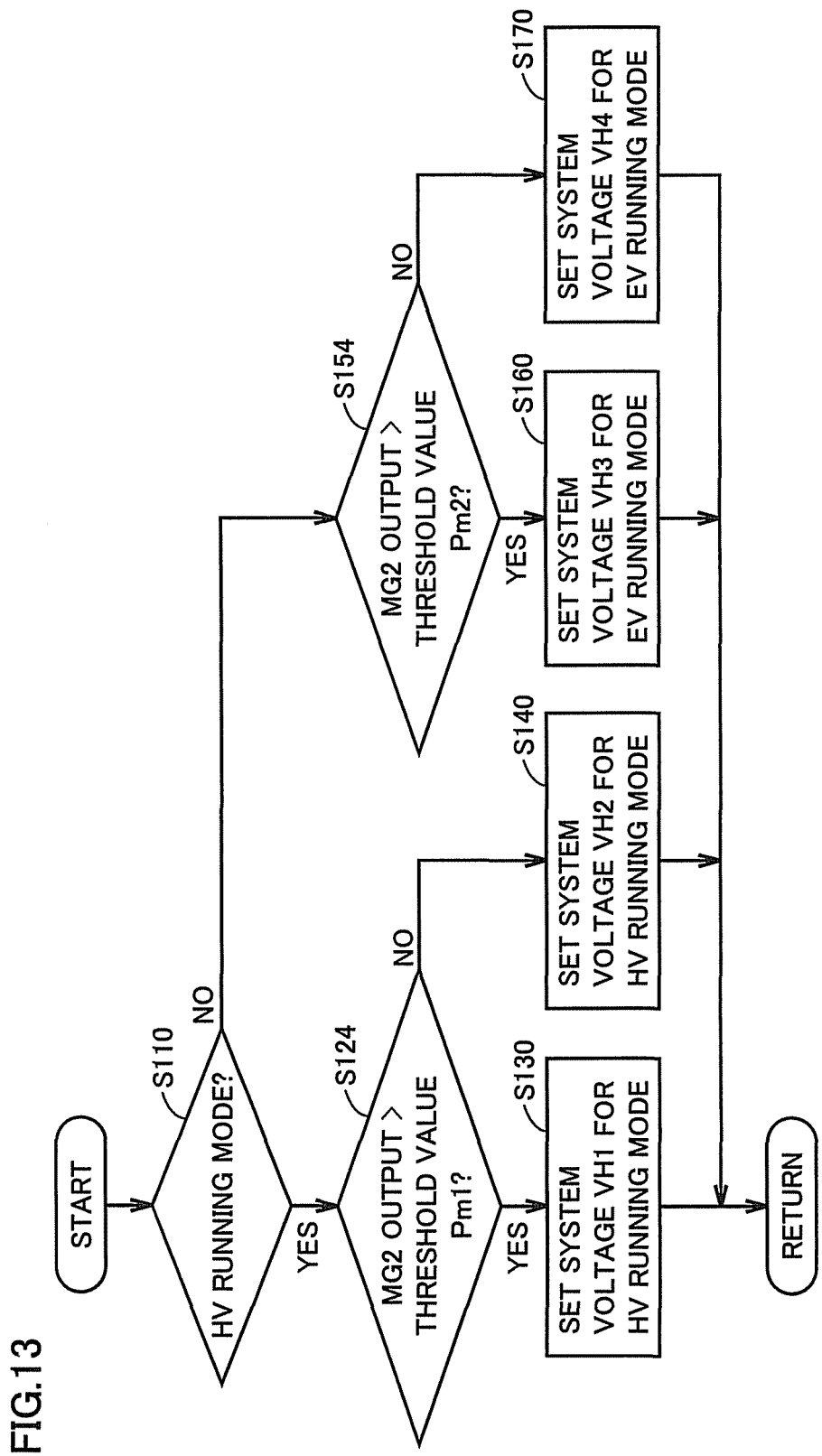
FIG. 13 is a flowchart to describe a series of procedures related to a system voltage setting process according to Modification 2 of the third embodiment.

FIG. 13 is a flowchart to describe a series of procedures related to a setting process of system voltage VH according to Modification 2 of the third embodiment. The procedure in the flowchart is invoked from the main routine to be executed at every predetermined time interval or every time a prescribed condition is met.

Referring to FIG. 13, the flowchart includes, based on the flowchart of FIG. 11, steps S124 and S154 instead of steps S120 and S150, respectively. When a determination is made that the running mode is an HV running mode at step S110 (YES at step S110), ECU 15 determines whether the output of motor generator MG2 is greater than a predetermined threshold value Pm1 (step S124).

When a determination is made that the output of motor generator MG2 is greater than threshold value Pm1 (YES at step S124), control proceeds to step S130. In contrast, when a determination is made that the output of motor generator MG2 is less than or equal to threshold value Pm1 (NO at step S124), control proceeds to step S140.

When a determination is made that the running mode is an EV running mode at step S110 (NO at step S110), ECU 15 determines whether the output of motor generator MG2 is greater than a predetermined threshold value Pm2 (step S154). When a determination is made that the output of motor generator MG2 is greater than threshold value Pm2 (YES at step S154), control proceeds to step S160. In contrast, when a determination is made that the output of motor generator MG2 is less than or equal to threshold value Pm2 (NO at step S154), control proceeds to step S170.

Advantages similar to those of the third embodiment are obtained in Modification 2.

Fourth Embodiment

Figure 14:
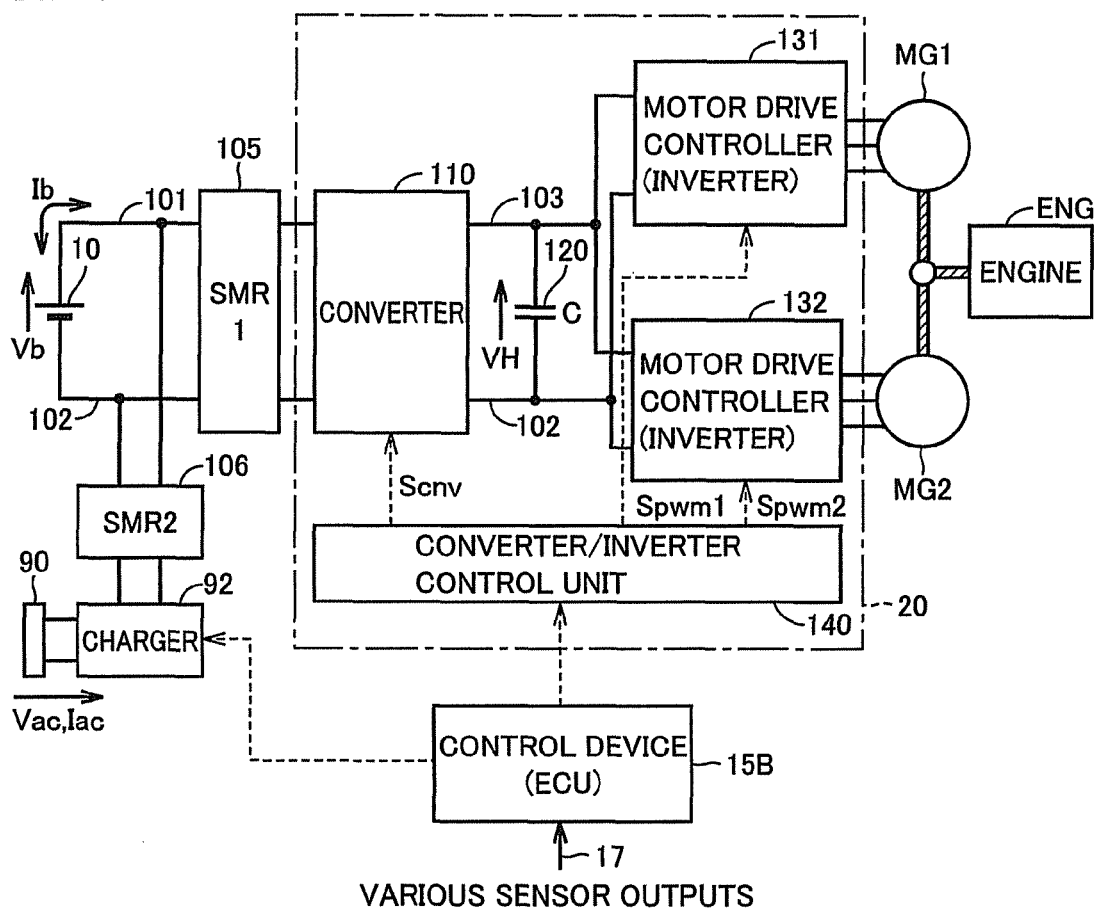
FIG. 14 is a block diagram representing a structure of an electric system of a hybrid vehicle according to a fourth embodiment.

FIG. 14 is a block diagram representing a configuration of an electric system in a hybrid vehicle according to a fourth embodiment. Referring to FIG. 14, the electric system of a hybrid vehicle according to the fourth embodiment includes, based on the configuration of the electric system shown in FIG. 2, a charging inlet 90, a charger 92, and an SMR 106, as well as an ECU 15B instead of ECU 15.

Charging inlet 90 is configured to allow connection with the connector of a charging cable (not shown) connected to a power supply external to the vehicle (hereinafter, also referred to as "external power supply"). At the time of charging of power storage device 10 by an external power supply (hereinafter, also referred to as "external charging"), electric power is received from an external power supply connected to charging inlet 90. The received electric power is supplied to charger 92. Charger 92 located between charging inlet 90 and power storage device 10 converts the electric power supplied from the external power supply connected to charging inlet 90 to the level of the voltage of power storage device 10 for output thereto. SMR 106 is provided between power storage device 10 and charger 92 to be turned ON in response to a command from ECU 15B during external charging.

ECU 15B generates a signal to drive charger 92 during external charging, and provides the generated signal to charger 92. ECU 15B controls the switching of the vehicle driving mode based on the SOC of power storage device 10. Specifically, ECU 15B controls the switching between a driving mode giving priority to running with engine ENG stopped (hereinafter, referred to as "CD (Charge Depleting) mode)", or a driving mode maintaining the SOC of power storage device 10 at a predetermined target with engine ENG operated (hereinafter, referred to as "CS (Charge Sustaining) mode"). ECU 15B modifies the setting of system voltage VH according to the aforementioned driving mode. The remaining function of ECU 15B is identical to that of ECU 15 of the first embodiment.

Figure 15:
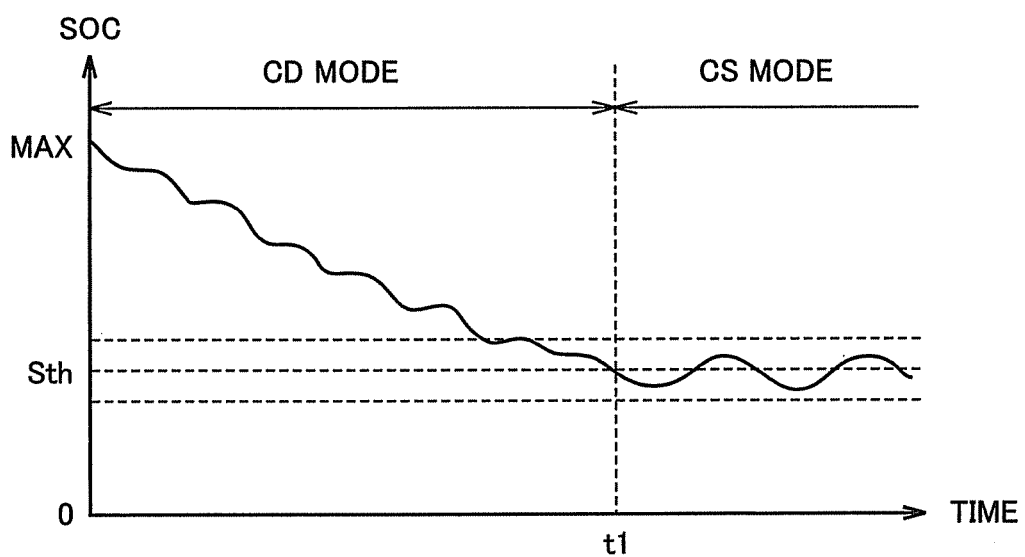
FIG. 15 represents a relationship between the SOC change of a power storage device and the driving mode.

FIG. 15 represents the relationship between a change in the SOC of power storage device 10 and the driving mode. Referring to FIG. 15, it is assumed that running is initiated after power storage device 10 attains a fully charged state (SOC=MAX) by external charging. Following external charging, the driving mode is set at the CD mode. During running in a CD mode, the SOC generally decreases in accordance with increase of the running distance as a whole although the SOC may be temporarily increased by the regenerative electric power obtained at the time of speed reduction or the like. When the SOC attains a threshold value Sth at time t1, the driving mode is switched to the CS mode, and the SOC is regulated in the vicinity of threshold value Sth.

Even in the CD mode, the operation of engine ENG is allowed such as when the accelerator pedal is stepped on greatly by the driver, when an engine driving type air conditioner is operated, in an engine warm-up state, or the like. The CD mode corresponds to a driving mode in which the electric power stored in power storage device is basically used as the energy source for the vehicle to run without maintaining the SOC of power storage device 10. During the CD mode, the rate of discharging is eventually relatively greater than charging. Meanwhile, the CS mode is a driving mode in which engine ENG is operated as necessary and electric power is generated by motor generator MG1 for maintaining the SOC of power storage device 10 at a predetermined target level, and is not limited to running with engine ENG always operated.

In other words, in the CD mode, the EV running mode is given priority, and the mode is switched to an HV running mode when the accelerator pedal is stepped on greatly and a large vehicle power is required. Furthermore, in a CS mode, the switching between an HV running mode and an EV running mode is repeated to maintain the SOC at the predetermined target.

In the fourth embodiment, the setting of system voltage VH is modified in a CD mode, as compared to that of the CS mode. Accordingly, system voltage VH can be set at the optimum level according to the driving mode, allowing the fuel economy to be further improved.

Figure 16:
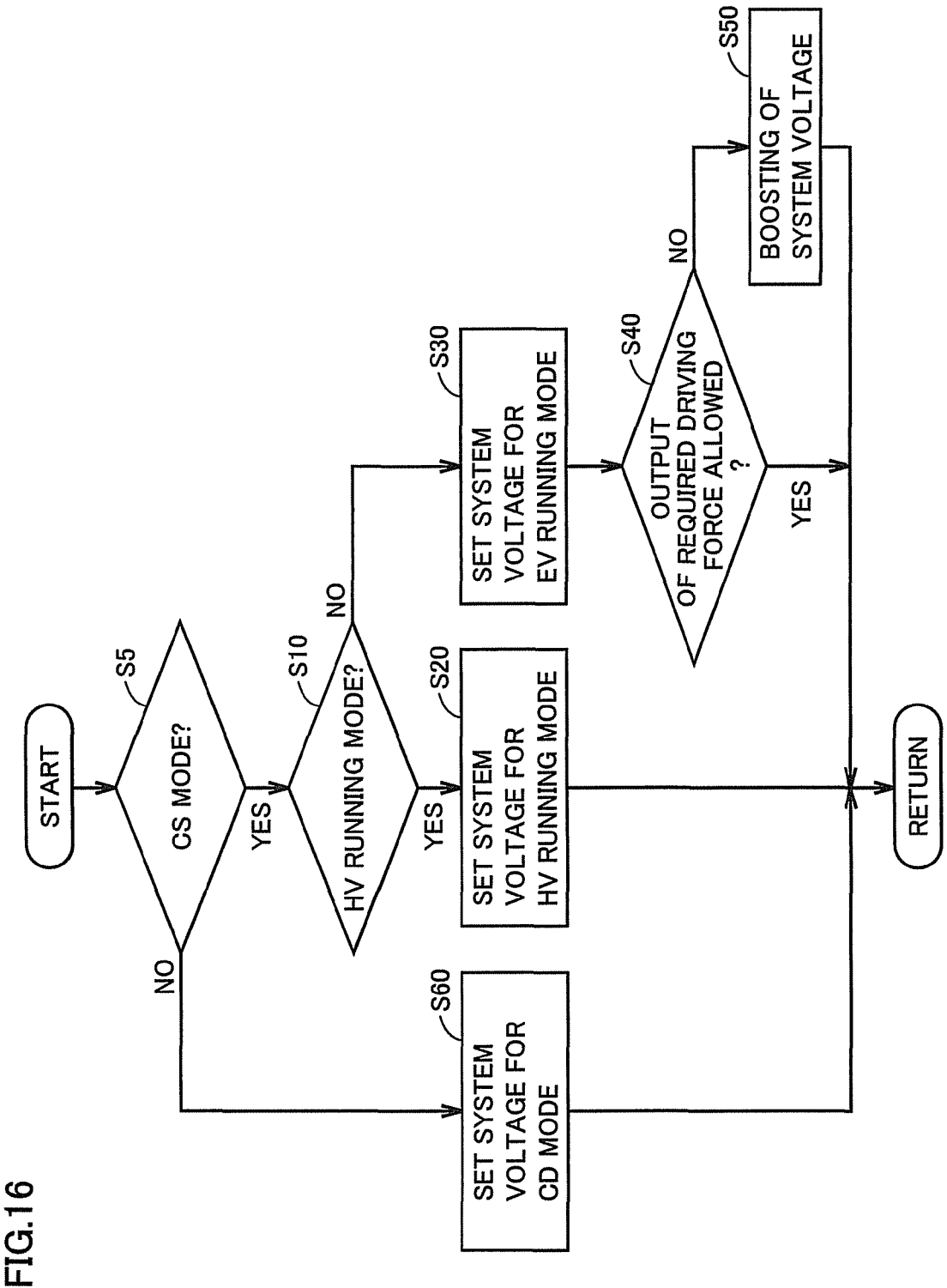
FIG. 16 is a flowchart to describe a series of procedures related to a system voltage setting process according to a fourth embodiment.

FIG. 16 is a flowchart to describe a series of procedures related to a setting process of system voltage VH according to the fourth embodiment. The procedure in the flowchart is invoked from the main routine to be executed at every predetermined time interval or every time a prescribed condition is met.

Referring to FIG. 16, the flowchart further includes, based on the flowchart shown in FIG. 4, steps S5 and S60. Specifically, ECU 15B first determines whether the driving mode is a CS mode or not (step S5). Step S5 is directed to the procedure for determining the driving mode, and a determination may be made based on whether the driving mode is a CD mode or not.

When a determination is made that the driving mode is a CD mode at step S5 (NO at step S5), ECU 15B sets system voltage VH at a value for the CD mode (step S60). When a determination is made that the driving mode is a CS mode at step S5 (YES at step S5), ECU 15B moves the control to step S10.

Although not particularly depicted, the upper limit setting of system voltage may be modified, likewise with the modification of the first embodiment. Furthermore, the setting of system voltage VH may be modified according to the rotational speed of motor generator MG2, the vehicle speed, the vehicle driving force, the output of motor generator MG2, and the like, as in the third embodiment and Modifications 1 and 2.

Thus, the fuel economy can be improved also in a CD mode according to the fourth embodiment.

Although each of the embodiments has been described based on a series/parallel type hybrid vehicle in which the power of engine ENG is output to at least one of the driving shaft and motor generator MG1, the present invention is also applicable to other types of hybrid vehicles. In other words, the present invention is applicable to the so-called series type hybrid vehicle that uses engine ENG only for driving motor generator MG1 and generates the vehicle driving force only by motor generator MG2, or a one-motor type hybrid vehicle using engine ENG as the main power source with the assist of the motor, as necessary, and capable of charging power storage device 10 using the motor also as a power generator.

In the 2-motor type hybrid vehicle set forth above in each of the embodiments, system voltage VH in an HV running mode is restricted by the revolution speed and the like of motor generator MG1 that operates as a power generator. Therefore, in an HV running mode, system voltage VH cannot be set as low as that for an EV running mode that is not subject to restrictions such as the revolution speed of motor generator MG1. Thus, the present invention that allows the setting of system voltage VH to be modified between an EV running mode and an HV running mode is particularly suitable for a 2-motor type hybrid vehicle.

In the description set forth above, engine ENG corresponds to an example of "internal combustion engine", whereas motor generator MG2 corresponds to an example of "power generator" in the present invention. Inverter 132 corresponds to an example of "driving device", whereas converter 110 corresponds to an example of "voltage conversion device" in the present invention. Further, ECUs 15, 15A and 15B correspond to an example of "control device" in the present invention. Economic mode switch 145 corresponds to an example of "input device" in the present invention.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 10 power storage device; 15, 15A, 15B ECU; 17 various sensor outputs; 20 PCU; 30 power output device; 35 accelerator pedal; 40 differential gear; 50L, 50R front wheel; 60L, 60R rear wheel; 90 charging inlet; 92 charger; 100 hybrid vehicle; 105, 106 SMR; 110 converter; 120 capacitor; 131, 132 inverter; 140 converter/inverter control unit; 145 economic mode switch; 150 SOC calculation unit; 152 running mode control unit; 154 system voltage control unit; MG1, MG2 motor generator; ENG engine.

The invention claimed is:

1. A hybrid vehicle comprising:
an internal combustion engine and an electric motor which generate vehicle driving force;
a power storage device;
an inverter which drives said electric motor;
a voltage conversion device provided between said inverter and said power storage device, and configured to boost an input voltage of said inverter to a level higher than a voltage of said power storage device; and
a control device which controls said voltage conversion device,
and sets, in a first running mode running with said internal combustion engine stopped, said input voltage with a tendency to become lower, than said input voltage for a second running mode using said internal combustion engine and said electric motor with said internal combustion engine operated.

2. The hybrid vehicle according to claim 1, wherein said control device modifies, in said first running mode, a setting of an upper limit of said input voltage, as compared to the setting of the upper limit for said second running mode.

3. The hybrid vehicle according to claim 1, wherein said control device sets, in said first running mode, said input voltage lower than said input voltage for said second running mode having an identical operating state of said electric motor generating vehicle driving force.

4. The hybrid vehicle according to claim 1, wherein said control device further modifies a setting of said input voltage, in a first driving mode giving priority to running with said internal combustion engine stopped, as compared to said setting of said input voltage for a second driving mode maintaining a charging state of said power storage device by generating electric power using said internal combustion engine.

5. The hybrid vehicle according to claim 1, further comprising an input device for a driver to select one of a normal mode and an economic mode,
wherein said control device modifies a setting of said input voltage to a level less than or equal to the setting for said normal mode, when said economic mode is selected through said input device,
a rate of decrease of said input voltage when said economic mode is selected in said first running mode being greater than said rate of decrease when said economic mode is selected in said second running mode.

6. The hybrid vehicle according to claim 1, wherein said control device further modifies a setting of said input voltage according to a rotational speed of said electric motor in each of said first running mode and said second running mode.

7. The hybrid vehicle according to claim 1, wherein said control device further modifies a setting of said input voltage according to the vehicle driving force in each of said first running mode and said second running mode.

8. The hybrid vehicle according to claim 1, wherein said control device further modifies a setting of said input voltage according to an output of said electric motor in each of said first running mode and said second running mode.

9. The hybrid vehicle according to claim 1, further comprising a power generator driven by said internal combustion engine to generate electric power, and capable of feeding electric power to said power storage device, in a power running operation of said electric motor.

10. A control method of a hybrid vehicle, said hybrid vehicle including
an internal combustion engine and an electric motor which generate vehicle driving force,
a power storage device,
inverter which drives said electric motor, and
a voltage conversion device provided between said inverter and said power storage device, and configured to boost an input voltage of said inverter to a level higher than a voltage of said power storage device, said control method comprising:
a first step of setting said input voltage for a first running mode running with said internal combustion engine stopped, and
a second step of setting said input voltage for a second running mode running using said internal combustion engine and said electric motor with said internal combustion engine operated,
said input voltage for said first running mode being set with a tendency to become lower than said input voltage for said second running mode.

11. The control method of a hybrid vehicle according to claim 10, wherein
said first step includes the step of setting an upper limit of said input voltage for said first running mode, and
said second step includes the step of setting the upper limit of said input voltage for said second running mode.

12. The control method of a hybrid vehicle according to claim 10, wherein said input voltage for said first running mode is set lower than said input voltage for said second running mode having an identical operating state of said electric motor generating vehicle driving force.

13. The control method of a hybrid vehicle according to claim 10, further comprising the step of setting said input voltage for a first driving mode giving priority to running with said internal combustion engine stopped,
wherein said first and second steps are executed in a second driving mode maintaining a charging state of said power storage device by generating electric power using said internal combustion engine.

* * * * *